United States Patent
Marton (10) Patent No.: US 8,295,502 B2
(45) Date of Patent: Oct. 23, 2012

(54) METHOD AND DEVICE FOR TYPING NOISE REMOVAL

(75) Inventor: Trygve F. Marton, Oslo (NO)

(73) Assignee: Cisco Technology, Inc., San Jose, CA (US)

( * ) Notice: Subject to any disclaimer, the term of this patent is extended or adjusted under 35 U.S.C. 154(b) by 441 days.

(21) Appl. No.: 12/495,270

(22) Filed: Jun. 30, 2009

(65) Prior Publication Data

US 2010/0027810 A1 Feb. 4, 2010

Related U.S. Application Data

(60) Provisional application No. 61/076,939, filed on Jun. 30, 2008.

(30) Foreign Application Priority Data

Jun. 30, 2008 (NO) .................................. 20082933

(51) Int. Cl.
   *A61F 11/06* (2006.01)
(52) U.S. Cl. ........................ 381/71.1; 381/94.1; 345/156
(58) Field of Classification Search ................ 381/71.1, 381/71.3, 71.7, 94.1–94.3, 94.7, 94.8, 57; 345/156, 169, 170, 171, 172
   See application file for complete search history.

(56) References Cited

U.S. PATENT DOCUMENTS

| 6,859,773 B2 * | 2/2005 | Breton .......................... 704/226 |
| 7,224,810 B2 * | 5/2007 | Brown .......................... 381/94.3 |
| 7,567,677 B1 * | 7/2009 | Chan et al. .................... 381/71.1 |
| 2002/0173953 A1 | 11/2002 | Frey et al. |
| 2006/0167995 A1 | 7/2006 | Yong |
| 2007/0078645 A1 | 4/2007 | Niemisto et al. |
| 2008/0159560 A1 * | 7/2008 | Song et al. .................... 381/94.1 |

FOREIGN PATENT DOCUMENTS

EP         1 703 471 A1     9/2006

OTHER PUBLICATIONS

Carlos J. Teixeira, et al., "Spectral Subtraction for Front-End Noise Reduction in a Speech Recognizer", Paper presented at the $2^{nd}$ European Conference on Speech Communication and Technology, Eurospeech 91 Proceedings, vol. 2, pp. 499-502.
A.P. Varga, et al., "Hidden Markov Model Decomposition of Speech and Noise", Speech Research Unit, Royal Signals and Radar Establishment, St. Andrew's Road, Malvern, WR14 3PS, Great Britain, pp. 845-848.
"Method for Computer Keyboard Noise Cancellation for Telephone and VoIP Applications", ip.com, PriorArtDatabase, Technical Disclosure, IPCOM000147250D (4 pages).

* cited by examiner

*Primary Examiner* — Vivian Chin
*Assistant Examiner* — Friedrich W Fahnert
(74) *Attorney, Agent, or Firm* — Oblon, Spivak, McClelland, Maier & Neustadt, L.L.P.

(57) ABSTRACT

A method for reducing keyboard noise in conferencing equipment which includes a microphone and a keyboard, the method including: providing, at a noise reduction apparatus, an audio signal originating from the microphone; detecting, at the noise reduction apparatus, an operation of the keyboard; providing, at the noise reduction apparatus, a pre-stored estimate of a keyboard audio noise resulting from the operation of the keyboard upon detection of the operation of the keyboard; and calculating, at the noise reduction apparatus, a noise reduced output signal based on the estimate of the keyboard audio noise and the audio signal.

20 Claims, 4 Drawing Sheets

METHOD AND DEVICE FOR TYPING NOISE REMOVAL

CROSS-REFERENCE TO RELATED APPLICATIONS

The present application claims the benefit of provisional application 61/076,939, filed in the U.S. patent and trademark office on Jun. 30, 2008, the entire contents of which is hereby incorporated by reference. The present application claims priority to Norwegian patent application number NO 20082933, filed in the Norwegian patent office on Jun. 30, 2008, the entire contents of which is hereby incorporated by reference.

TECHNICAL FIELD

Embodiments described herein relate to audio noise reduction in conference equipment. Described herein are a method and a device for reducing keyboard noise in conferencing equipment which includes a microphone and a keyboard, such as a videoconferencing endpoint, a desktop videoconferencing endpoint, or a conference telephone.

BACKGROUND

Many communication appliances, as well as recording equipment, have keyboards for control in the same physical enclosure as a microphone capturing the sound. Examples of such appliances are desktop videoconferencing equipment, audio conference phones, mobile telephones, other types of telephones, MP3 recorders, tape recorders or similar devices.

When pressing a key on the keyboard, an acoustic sound (keyboard noise) is created. Normally, this sound is unwanted. In the local room, the keyboard noise is usually of such low level that it doesn't disturb the user very much. When the audio is captured at a microphone, for communication or archiving, keyboard noise may be disturbing. Noise from the keyboard may transfer to the microphone both as sound propagating through the air, and as sound propagating through the physical structure of an equipment enclosure.

Keyboard noise usually lasts for a very short time, but is often picked up relatively strong at the microphone, and it is usually broadband noise. Such keyboard noise has previously been handled in various ways. The simplest one is accepting the noise. Another previous approach is known as masking, wherein a masking tone is added at the same time as the occurrence of the keyboard noise Such masking may make the keyboard noise inaudible or neglectable, or it may make the user focus on something else, or at least make the user aware that something is happening and therefore more accepting for the audible noise. Another suggested approach is muting the entire audio signal (including both the keyboard noise and the wanted signal) when a key is pressed on the keyboard.

Spectral subtraction is a widely used approach for removal of relatively low level, stationary broadband noise. Based on an assumption that noise is stationary, it calculates an estimate of the noise, from which it defines a linear time invariant filter, which is applied to the wanted signal including unwanted noise. The result is an output signal with a magnitude spectrum which is fairly equal to the magnitude spectrum of the wanted signal, but with a phase equalling the wanted signal plus unwanted noise phase. As long as the noise level is moderate, the phase error is small, yielding a well sounding result. When noise level increases, artifacts become more and more audible and annoying. People skilled in the art will consider spectral subtraction useful for stationary noise, not for transient noise such as keyboard noise.

SUMMARY

Described herein are a method, apparatus, and computer readable storage medium for reducing keyboard noise in conferencing equipment.

A first exemplary embodiment includes:
a method for reducing keyboard noise in conferencing equipment which includes a microphone and a keyboard, the method including: providing, at a noise reduction apparatus, an audio signal originating from the microphone; detecting, at the noise reduction apparatus, an operation of the keyboard; providing, at the noise reduction apparatus, a pre-stored estimate of a keyboard audio noise resulting from the operation of the keyboard upon detection of the operation of the keyboard; and calculating, at the noise reduction apparatus, a noise reduced output signal based on the estimate of the keyboard audio noise and the audio signal.

A second exemplary embodiment provides a computer readable storage medium encoded with instructions, which when executed by a noise reduction apparatus causes the noise reduction apparatus to implement the method of the first exemplary embodiment.

A third exemplary embodiment includes:
a noise reduction apparatus configured to reduce keyboard noise in conferencing equipment which includes a microphone and a keyboard, the noise reduction apparatus including: a receiver configured to receive an audio signal originating from the microphone; a keyboard operation detecting unit configured to detect an operation of the keyboard; and a processor configured to retrieve a pre-stored estimate of a keyboard audio noise resulting from the operation of the keyboard from a memory device upon detection of the operation of said keyboard, and to calculate a noise reduced output signal based on said estimate of the keyboard audio noise and the audio signal.

BRIEF DESCRIPTION OF THE DRAWINGS

In order to make the exemplary embodiments more readily understandable, the discussion that follows will refer to the accompanying drawings, wherein.

DETAILED DESCRIPTION

In the following, the exemplary embodiments will be discussed by referring to the accompanying drawings. However, people skilled in the art will realize other applications and modifications within the scope of the invention as defined in the claims.

Figure 1:
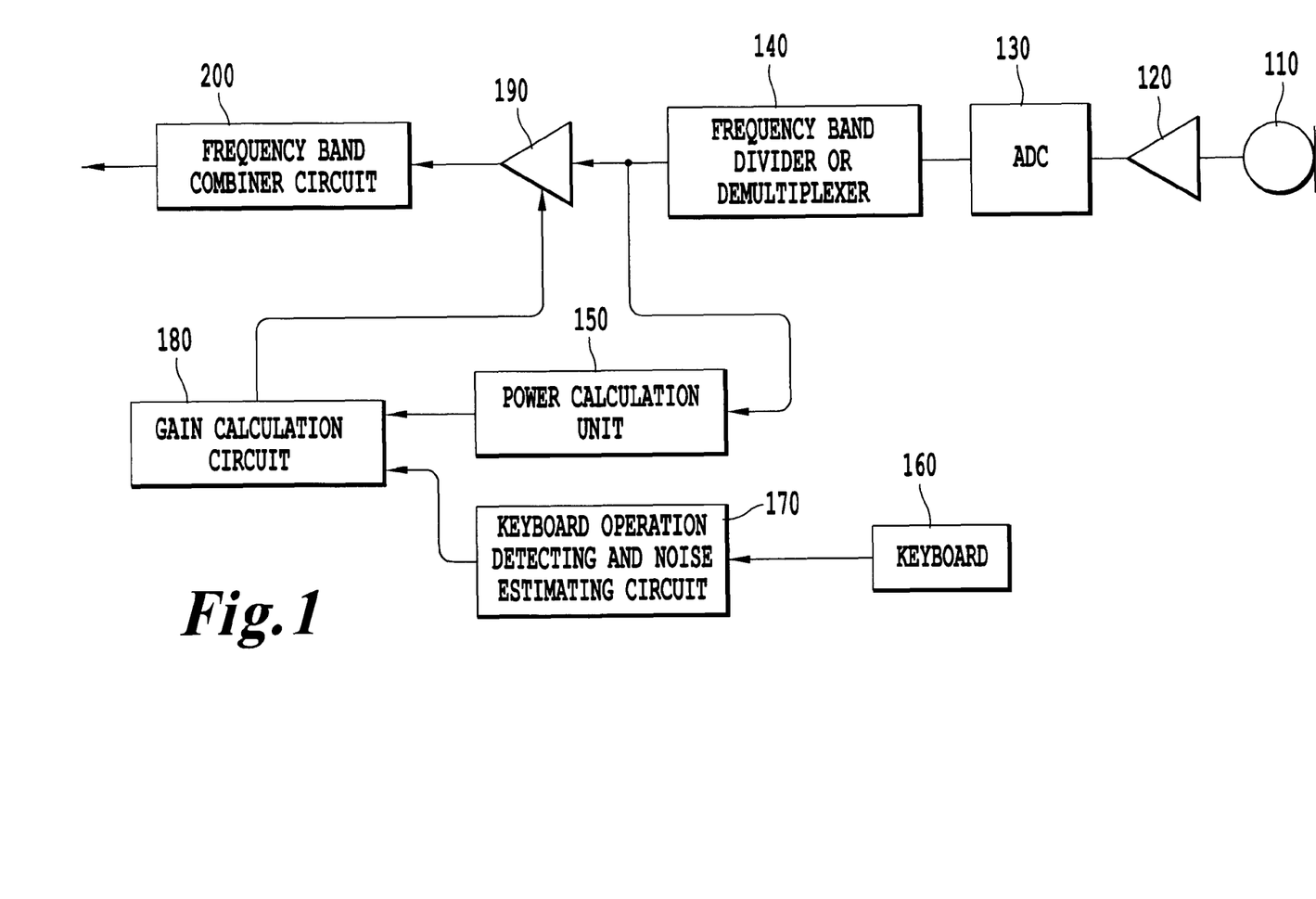
FIG. 1 is a schematic block diagram illustrating a device for reducing keyboard noise in conferencing equipment.

FIG. 1 is a schematic block diagram illustrating a device for reducing keyboard noise in conferencing equipment.

The conference equipment includes a microphone 110 and a keyboard 160. The microphone and keyboard 160 are arranged in such a way that the microphone picks up both wanted audio, typically speech from a speaker (a conference participant), and unwanted audio noise, which may be generated by manual operation of the keyboard 160. In addition, the microphone may pick up background noise from the environment, in particular the conference room. The microphone 110 is connected to an amplifier 120, which may also advantageously include a low pass filter. The amplifier is further connected to the quantizer/digitizer 130, which includes circuits for sampling and analog-digital conversion, resulting in a digital audio signal at the output of element 130. This digital audio signal is fed to a frequency band divider 140, or frequency band demultiplexer, which is further explained in detail below with reference to FIG. 2. In FIG. 1, only one output of the frequency band divider 140 has been shown for simplicity. The output from the frequency band divider 140 represents a time-varying portion of the audio signal in a frequency sub band defined by characteristics of the frequency band divider.

The frequency sub bands, in particular the distribution of the frequency limits determining the frequency sub bands, may be configured in various ways. In one possible aspect, the distribution of the frequency limits is configured in accordance with a uniform scale (i.e. in a linear manner). In other possible aspects, the frequency limits are configured in accordance with a logarithmic scale, or with a special scale of psychoacoustic type, such as a Mel scale or Bark scale.

The output from the frequency band divider 140 is connected to the power calculation circuit 150, which calculates the power of the signal provided by the frequency band divider 140. In alternative aspects, the amplitude or any other measure indicating the magnitude of the signal could be calculated in the calculation circuit 150.

The keyboard 160 is connected to a keyboard operation detecting and noise estimating circuit 170. In this circuit 170, the operation of the keyboard is detected and possibly identified. Upon the detection of a keyboard operation, the circuit 170 causes an estimate of a keyboard audio noise, i.e. an estimate of the noise that results from the operation of the keyboard, to be provided.

The noise estimating circuit 160 may provide the estimate of the keyboard noise as a pre-stored estimate of noise power in a frequency sub band with respect to time. The pre-stored estimate may be selected as a power signal sample which is read from a pre-stored look-up table. The selection of the power signal sample may be based on an identification of a key that has actually been operated on the keyboard. This identification may be derived by the keyboard operation detecting and noise estimating circuit 170, which is connected to the keyboard and thus may obtain an identification of the pressed keys in addition to the mere detection of keyboard activity.

Such a pre-stored table may be pre-generated once, in a static fashion, or it may be established by training, e.g. during the operation of the keyboard in a noise-free or low-noise environment.

The table may also be adaptive, as mentioned further below with reference to FIG. 2.

The output of the power calculation circuit 150 and the output of the keyboard operation detecting and noise estimating circuit 170 are fed to the gain calculation circuit 180. An exemplary operation of the gain calculation circuit is explained in closer detail below with reference to FIG. 2.

The gain value provided by the gain calculator 180 is fed to a gain control input of the gain controlled amplifier 190. The signal input of the amplifier 190 is connected to the output of the frequency band divider 140.

This results in that the output signal of the amplifier 190 is considerably attenuated in case of a prevailing estimated keyboard noise in the frequency sub band selected by the frequency band divider 140, while the output signal is less attenuated, or not attenuated at all, in case of a small or zero estimated keyboard noise in the selected frequency sub band.

The output of the amplifier 190 is fed to an input of a frequency band combiner circuit 200 which combines said input with corresponding input signals relating to other frequency sub bands. This results in that a combined digital audio signal is generated as the output of the circuit 200.

In an exemplary embodiment, the output signal generated by the circuit 200 is further modified by circuits and means which are not shown in FIG. 1. Instead, such additional circuits and means have been illustrated and explained with reference to FIG. 2. More specifically, in this exemplary embodiment, a comfort noise signal is generated and added to the noise reduced output signal. The adding of a comfort noise signal may include calculating a comfort noise gain which is based on the audio signal in the frequency sub band, i.e. the output of circuit 140, and the generated estimate of the keyboard audio noise, i.e. the output of the circuit 170. Comfort noise is an artificial background noise added to voice communications during periods of silence that occur during the course of a conversation.

Figure 2:
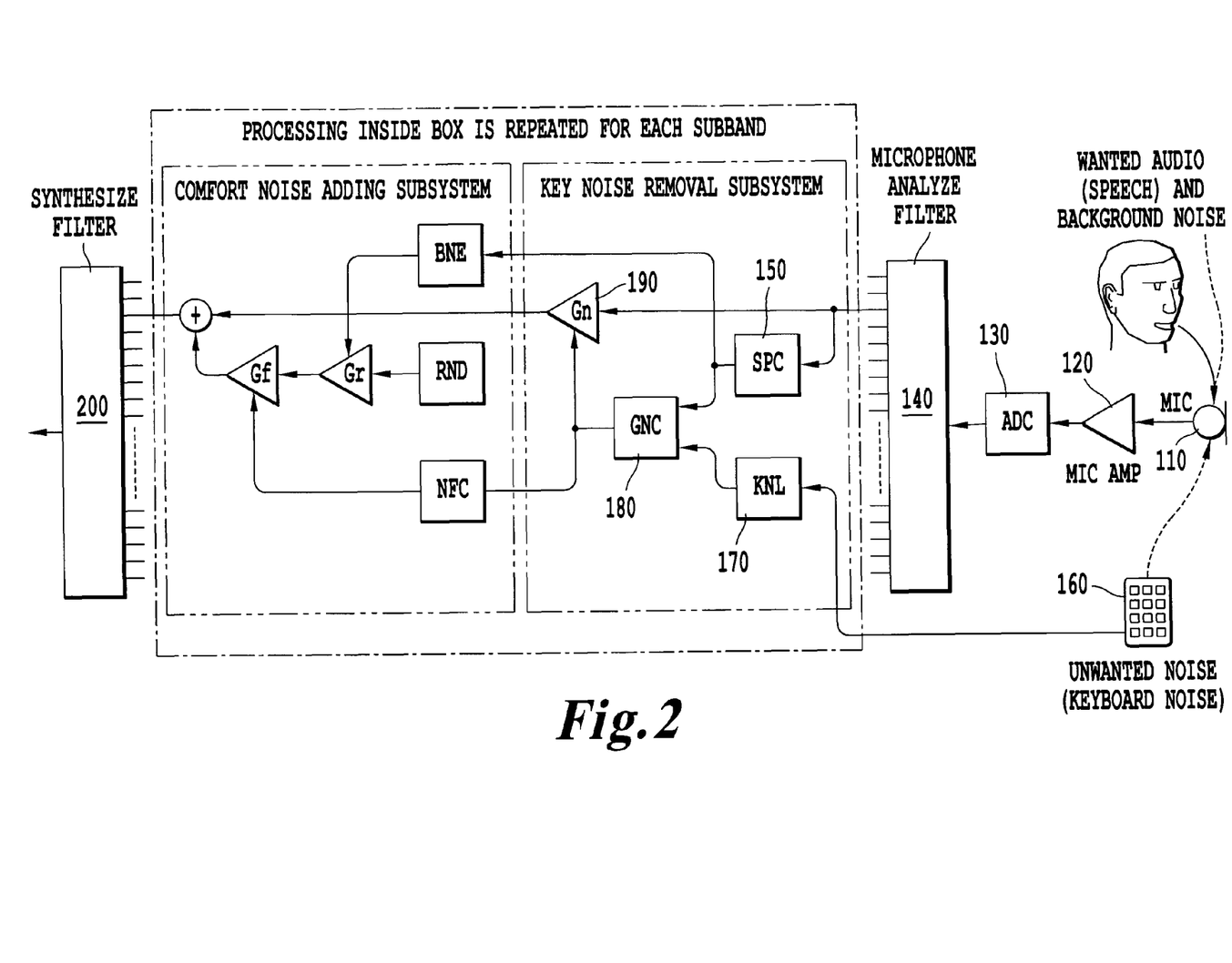
FIG. 2 is a schematic block diagram illustrating a device for reducing keyboard noise in conferencing equipment.

FIG. 2 is a schematic block diagram illustrating a device for reducing keyboard noise in conferencing equipment. Many of the elements illustrated in FIG. 2 correspond to similar elements with similar reference numerals on FIG. 1. Where further optional details are presented in the detailed description in FIG. 2, it should be understood that such optional details may be combined individually or in any combination, with the device described above with reference to FIG. 1.

The microphone 110 and the keyboard 160 are included in the conference equipment in the same way as explained with reference to FIG. 1. The user (speaker, conference participant) 102 provides a wanted acoustic speech signal to the microphone, while unwanted audio noise generated by the operation of the keyboard 160 is also picked up by the microphone 110.

The microphone 110 is connected to an amplifier 120, which may also advantageously include a low pass filter. The amplifier is further connected to the quantizer/digitizer 130, which includes circuits for sampling and analog-digital conversion, resulting in a digital audio signal at the output of element 130. This digital audio signal is fed to a frequency band divider 140, or frequency band demultiplexer.

As illustrated in FIG. 2, a plurality of outputs of the frequency band divider 140 has been shown, but the further handling of only one of the output signals has been shown for simplicity. The output from the frequency band divider 140 represents a time-varying portion of the audio signal in a frequency sub band defined by characteristics of the frequency band divider.

Each frequency sub band represents a small fraction of the complete frequency spectrum of the full band signal.

The frequency sub bands, in particular the distribution of the frequency limits determining the frequency sub bands, and the width of each band, may be configured in various ways. In one exemplary embodiment, the distribution of the frequency limits is configured in accordance with a uniform scale (i.e. in a linear manner). In another exemplary embodiment, the frequency limits are configured in accordance with a logarithmic scale, or with a special scale of psychoacoustic type, such as a Mel scale or Bark scale. Further, each frequency sub band signal undergoes a processing before all sub bands are merged together to form a keyboard noise reduced full band signal. A sub band type realization may be advantageous since filter banks, i.e. the frequency band divider and frequency band combiner, may already be present for other purposes, such as echo cancelling, stationary noise reduction, etc. In such a case, the sub band type realization described herein does not represent very much additional complexity to the system.

Also, the sub band realization implies that all necessary spectrum calculations and filter calculations/operations are reduced to simple power calculations and gains, respectively.

In an alternative embodiment, all processing may be performed directly on the full band signal. In this case, the frequency band divider 140 and the frequency band combiner 200 are not necessary. However, higher calculation capabilities will be needed for the further signal processing in this case. The output from the frequency band divider 140 is connected to the power calculation circuit 150, which calculates the power of the signal provided by the frequency band divider 140. In alternative aspects, the amplitude or any other measure indicating the magnitude of the signal could be calculated in the calculation circuit 150.

The power calculation circuit 150 may be configured to calculate the power of the signal in each frequency sub band by the following the equation, for example:

$$siglev(k,n) = siglev(k,n-1) + \Gamma(abs(sigsample(k,n))^\kappa - siglev(k,n-1)),$$

wherein k is the sub band index, n is the time index, sigsample is the signal sample value of the sub band signal, and siglev denotes a smoothed estimate of the mean absolute value (for $\kappa=1$) or mean square (for $\kappa=2$) of consecutive signal samples. In the following discussion and parameter setting, $\kappa=1$ is assumed, but any value $\kappa \in [1,2]$ gives satisfactory results.

$\Gamma$ is a value defining a time constant, and its value will depend on the sampling rate in the frequency sub band. A $\Gamma$ giving a time constant (standard analog definition, siglev falling from $1/e \approx 37\%$ of its original value in one time constant if no input are applied, i.e. sigsamples equals zero) of 30 ms is a preferred choice. Siglev includes both wanted audio and unwanted keyboard noise.

Similarly, if implicitly known, a keyboard noise level could be estimated by the following equation:

$$keylev(k,n) = keylev(k,n-1) + \Gamma(abs(keysample(k,n))^\kappa - keylev(k,n-1)).$$

In this equation, k, n, $\Gamma$ and $\kappa$ are the same as in the previous equation, and keylev is a smoothed estimate of the mean absolute value of the keyboard noise.

According to the equation above, the keyboard noise sample, denoted keysample in the above equation, will have to be known or estimated in order to calculate the estimated keyboard noise. Since the keyboard noise sample keylev(k,n) is generally not known, it is estimated in the noise estimating circuit 170. In an exemplary aspect, the keyboard noise estimating circuit 170 utilizes a memory device storing a keyboard noise level lookup table, and the keyboard noise sample keylev(k, n) is tabulated in the keyboard noise level lookup table 170, in FIG. 2 also denoted KNL. The idea behind the use of a keyboard noise estimating circuit 170, in particular a keyboard noise level lookup table, is that even though sample values of the keyboard noise will have very random characteristics, and therefore are not feasible to tabulate, the keyboard noise level as a function of frequency (i.e. sub band index k) and time (i.e. time index n) do have an adequate repeatability between different presses of a key.

The keyboard noise level lookup table is trained either once, during design of the product, or during production, or it may even be adaptively trained during use of the product, by averaging keylev calculations made from multiple instances of samples recorded using the keyboard/appliance in a noise free environment. Which learning strategy which should be used, may, for example, depend on the quality of the keyboard. For high quality appliances, keyboard noise will approximately be similar between different units in production, and thus a design phase estimation can be used. For lower quality appliances, keylev estimation might be necessary to measure for each different unit. Such predefinitions could be replaced or combined with an adaptive learning during use, by updating the lookup table for key presses done without any or neglectable additional sound.

Due to different physics (for example keys), distance from keyboard to microphone or similar, it might be necessary to tabulate different keylev for different keys or set of keys. Also, if the sampling rate in the sub bands is very low, i.e. time between samples comparable to the time constant of signal level, it may be necessary to tabulate interpolated versions of keylevs, or to interpolate the levels runtime.

As will be understood from the above explanation, the keyboard 160 is connected to the keyboard operation detecting and noise estimating circuit 170. In this circuit 170, the operation of the keyboard is detected and possibly identified. Upon the detection of a keyboard operation, the circuit 170 causes en estimate of a keyboard audio noise, i.e. an estimate of the noise that results from the operation of the keyboard, to be provided.

In an exemplary embodiment, the noise estimating circuit 160 may provide the estimate of the keyboard noise as a pre-stored estimate of noise power in a frequency sub band with respect to time. The pre-stored estimate may be selected as a power signal sample which is read from a pre-stored look-up table. The selection of the power signal sample may be based on an identification of the key that has actually been operated on the keyboard. This identification may be derived by the keyboard operation detecting and noise estimating circuit 170, which is connected to the keyboard and thus may obtain an identification of the pressed keys in addition to the mere detection of keyboard activity.

Such a pre-stored table may be pre-generated once, in a static fashion, or it may be established by training, e.g. during the operation of the keyboard in a noise-free or low-noise environment. The table may also be adaptive. The output of the power calculation circuit 150 and the output of the keyboard operation detecting and noise estimating circuit 170 are fed to the gain calculation circuit 180.

The actual noise removal process defined herein may, in some cases, be relatively forgiving for deviations in keyboard noise levels, i.e. keylev. Thus, for a given time, the key level lookup table may output the key noise level estimate keylev for a given key and time, based on a control input from the keyboard, indicating time of pressure and which key is pressed. If no key has been pressed, keylev may be zero.

The gain value provided by the gain calculating circuit 180 is fed to a gain control input of the gain controlled amplifier 190. The signal input of the amplifier 190 is connected to the output of the frequency band divider 140. The gain calculation circuit 180, in FIG. 2 also denoted GNC, is configured to calculate a signal gain for the sub band based on the following equation:

$$keynoisegain(k,n) = \max(\phi,(siglev(k,n)^\kappa - (1+\delta) * keylev(k,n)^\kappa)/(siglev(k,n)^\kappa)).$$

In this equation, $\delta$ is a key noise level overestimation factor. It may be chosen according to possible deviation in the keyboard noise level from the actual level. It may be set higher for lower quality appliances/keyboards than for high quality appliance/keyboards. Normally, it is preferable to overestimate the key noise than to underestimate it.

The constant φ defines the wanted attenuation of keyboard noise, and is preferably set to zero.

The constant λ usually equals 1/κ. If κ=2, λ=1/κ and δ=0, the formula is very similar to the formula used in spectral subtraction for stationary noise removal, referred to above. However, κ=2, λ=1 and δ=0 could be chosen, and then the formula is very similar to Wiener filtering.

In a particular embodiment, κ=1. In another particular embodiment, λ=1. In another particular embodiment, δ=⅓. In still another particular embodiment, κ=1, λ=1 and δ=⅓. This gives a particularly good result for a high quality keyboard, and represents a modified spectral subtraction formula.

This results in that the output signal of the amplifier 190 is considerably attenuated in case of a prevailing estimated keyboard noise in the frequency sub band selected by the frequency band divider, while the output signal is less attenuated, or not attenuated at all, in case of a small or zero estimated keyboard noise in the selected frequency sub band.

The output of the amplifier 190 is fed to an input a frequency band combiner circuit 200 which combines said input with corresponding input signals relating to other frequency sub bands. This results in that a combined digital audio signal is generated as the output of the circuit 200.

The amplifier 190 may have a gain Gn, applying keynoisegain to the signal samples including key noise.

$$noiseredsample(k,n)=keynoisegain(k,n)*sigsample(k,n)$$

This works very well in removing noise presence of speech. The speech signal passes the gain without substantial audible attenuation of any of the speech signal. However, when the input signal is low level background noise only, the algorithm may reduce gain so much that it sounds muted. This is not important from an informational theory perspective, as background noise usually is unwanted, but in practical use, loss of noise may be perceived as a loss of connectivity, in a conference or similar communication session.

Similar effects are also present in half duplex communication systems, and are often compensated for by adding so called comfort noise. It may be advantageous to use the same technique after key noise removal as well. Very often, a comfort noise generator already exists in the appliance.

Background noise is estimated by the background noise estimator BNE. Many different techniques are possible, the minimum statistics being an exemplary option:

$$noilev(k,n)=noilev(k,n-1)+\max(0,\alpha_{U^*}(siglev(k,n)-noilev(k,n-1)))+\min(0,\alpha_{D^*}(siglev(k,n)-noilev(k,n-1))).$$

The constant $\alpha_U$ bay be chosen small and represents a long time constant (typically seconds, e.g. 10 seconds), whereas the constant $\alpha_D$ represents a shorter time constant (typically a small fraction of a second, e.g. 0.01 seconds). The result is that the noise level estimate falls fast to the actual noise level in time with only noise present, whereas the noise level rises slow, avoiding that the noise estimate increases in periods with speech.

Of course, many other types of noise estimation techniques exist. The choice of technique may be selected by the skilled person according to circumstances.

A random generator RND generates a random, white signal of unity level. This signal is scaled by the gain function Gr, equalling noilev, to generate a noise sample estimate:

$$noisest(k,n)=noilev(k,n)*random(k,n).$$

The level of the noise estimates equals the level of the background noise. The noise estimate samples are used to fill in for lost noise caused by Gn. Estimated noise samples are uncorrelated with the actual noise, and random noise will therefore be added to the remaining background noise on a power basis. The noise fill gain calculator NFC calculates the appropriate gain:

$$noisefillgain(k,n)=sqrt(1-keynoisegain(k,n)^2)$$

Finally, the random noise is scaled by the noise fill gain function Gf and added to the output sample:

$$outputsample(k,n)=noiseredsample(k,n)+noisefillgain(k,n)*noisest(k,n)$$

In the frequency band combiner circuit 200, all sub bands are merged, e.g. using a synthesize filter. Virtually, this results in a keyboard noise free audio signal, passing speech signal, with no perceptive loss of background noise. The optional, additional circuits on FIG. 2, included in the box "Comfort noise adding subsystem", have the effect that a comfort noise signal is generated and added to the noise reduced output signal. The adding of a comfort noise signal may comprise calculating a comfort noise gain which is based on the audio signal in the frequency sub band, i.e. the output of circuit 140, and the generated estimate of the keyboard audio noise, i.e. the output of the circuit 170.

Figure 3:
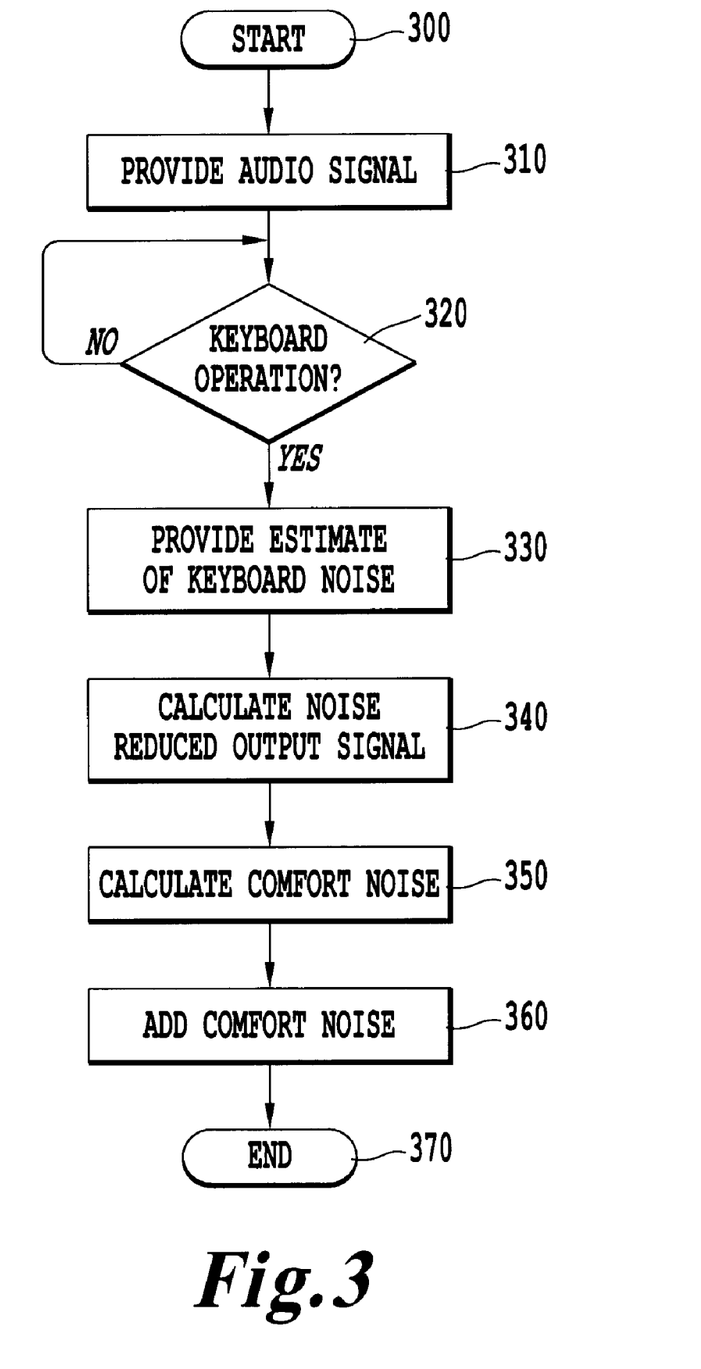
FIG. 3 is a schematic flow chart illustrating a method for reducing keyboard noise in conferencing equipment.

FIG. 3 is a schematic flow chart illustrating a method for reducing keyboard noise in conferencing equipment which includes a microphone and a keyboard.

The method starts at the initiating step 300.

First, in step 310, an audio signal, originating from the microphone, is provided.

The providing step 310 may comprise steps for amplifying, filtering, sampling and digitizing, whereby the audio signal is provided as a digital audio signal.

The digital audio signal may be further split or divided into frequency sub bands by means of a frequency band selector/frequency demultiplexer. The following processing steps may be performed on each of the frequency sub bands. The frequency sub bands may be configured in accordance with a scale selected from the set consisting of a uniform scale, a logarithmic scale, and a psychoacoustic type scale such as a Mel scale or Bark scale.

Next, in the detection step 320, an operation of the keyboard is detected. Upon the detection of keyboard activity/keyboard operation, the process continues at step 330.

Next, in the keyboard noise estimate providing step 330, an estimate of the keyboard audio noise, resulting from the detected operation of said keyboard, is provided.

The estimate of keyboard noise may be provided as a pre-stored estimate, which may be selected from pre-stored data such as a lookup table. The selection of the pre-stored estimate among the pre-stored data may be based on an identification of a key operated on the keyboard. The pre-stored data may be pre-generated by training.

Next, in the output signal calculating step 340, a noise reduced output signal is calculated based on the estimate of the keyboard audio noise and the audio signal. The calculating step 340 may comprise spectral subtraction. The calculating step 340 may comprise, for each frequency sub band, calculating a gain value which is based on the audio signal, or more particularly its power in the frequency sub band in question, and the provided estimate of the keyboard audio noise. Further, the audio signal is amplified using this gain value as a gain factor. Further, in the optional comfort noise calculation step 360, a comfort noise signal may be generated.

Further, in the optional noise adding step 360, the comfort noise signal may be added to the noise reduced output signal.

The step of adding said comfort noise signal may comprise calculating a comfort noise gain value, wherein the calculating is based on the audio signal, in particular its power in the frequency sub band in question, and the generated estimate of the keyboard audio noise.

It should be understood that the steps of the method illustrated in FIG. 3 may be further specified in closer detail by the disclosure of FIGS. 1 and 2 and their corresponding detailed description above, since the illustrated method and the corresponding device correspond to each other. More specifically, the device for reducing keyboard noise in conferencing equipment may comprise processing means that are configured to perform the disclosed method. Such processing means may be distributed, i.e. as separate processing devices in each element of the device, or alternatively the processing means may be implemented as a central processing unit which performs the calculating operations of all the elements of the device or a combination of the elements included in the device. Exemplary processing means is shown in FIG. 4.

Figure 4:
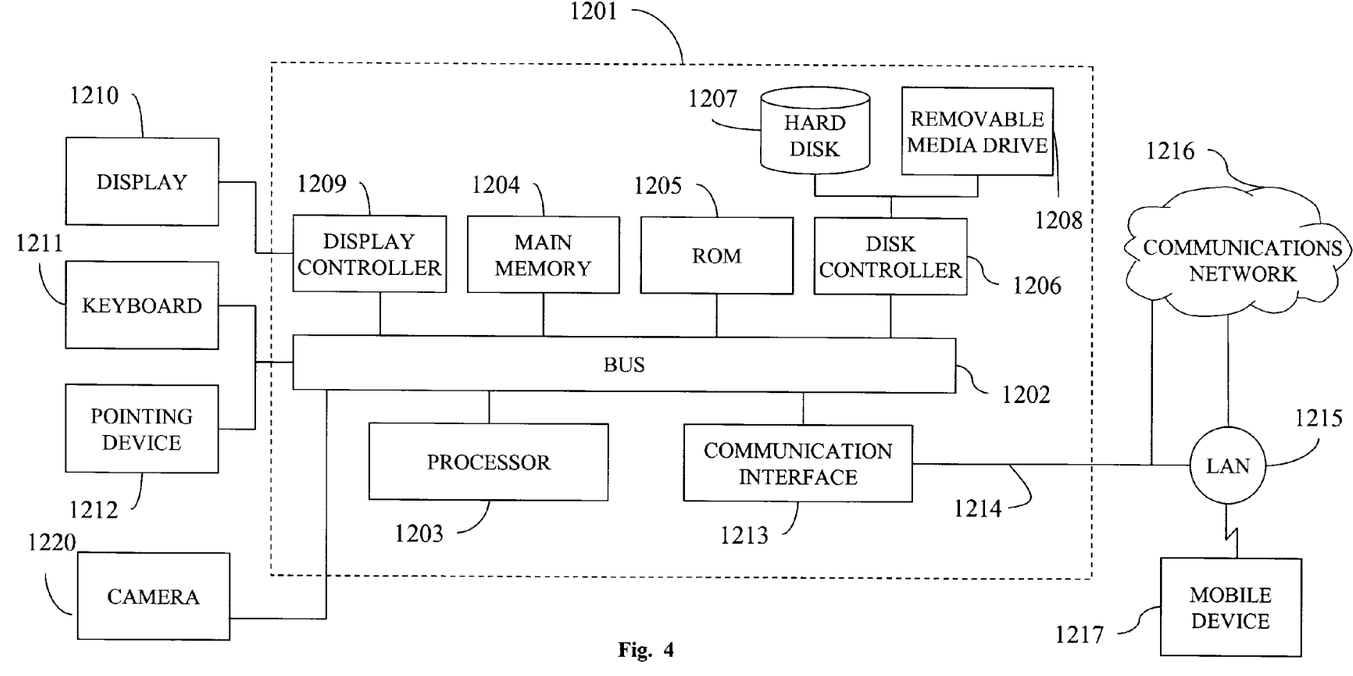
FIG. 4 illustrates a computer system upon which an embodiment of the present invention may be implemented.

FIG. 4 illustrates an example of video conferencing device configured to implement an embodiment described supra. The computer system 1201 includes a bus 1202 or other communication mechanism for communicating information, and a processor 1203 coupled with the bus 1202 for processing the information. The computer system 1201 also includes a main memory 1204, such as a random access memory (RAM) or other dynamic storage device (e.g., dynamic RAM (DRAM), static RAM (SRAM), and synchronous DRAM (SDRAM)), coupled to the bus 1202 for storing information and instructions to be executed by processor 1203. In addition, the main memory 1204 may be used for storing temporary variables or other intermediate information during the execution of instructions by the processor 1203. The computer system 1201 further includes a read only memory (ROM) 1205 or other static storage device (e.g., programmable ROM (PROM), erasable PROM (EPROM), and electrically erasable PROM (EEPROM)) coupled to the bus 1202 for storing static information and instructions for the processor 1203.

The computer system 1201 also includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display 1210, such as the multiview display devices discussed supra, for displaying information to a user. The computer system includes input devices, such as a keyboard 1211 and a pointing device 1212, for interacting with a computer user and providing information to the processor 1203. The pointing device 1212, for example, may be a mouse, a trackball, or a pointing stick for communicating direction information and command selections to the processor 1203 and for controlling cursor movement on the display 1210. In addition, a printer may provide printed listings of data stored and/or generated by the computer system 1201.

The computer system 1201 performs a portion or all of the processing steps of the exemplary embodiments discussed supra in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204.

The computer system 1201 includes at least one computer readable storage medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes.

Stored on any one or on a combination of computer readable storage media, the exemplary embodiments include software for controlling the computer system 1201, for driving a device or devices for implementing the invention, and for enabling the computer system 1201 to interact with a human user (e.g., video conference participant). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc). The signals through the various networks and the signals on the network link 1214 and through the communication interface 1213, which carry the digital data to and from the computer system 1201 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214 and the communication interface 1213. Moreover, the network link 1214 may provide a connection through a LAN 1215 to a mobile device 1217 such as a personal digital assistant (PDA) laptop computer, or cellular telephone.

Although the detailed description specifies that a digital audio signal originating from the microphone may be provided as a digital audio signal, it should be noted that it is also possible to provide the audio signal as an analog signal.

Numerous modifications and variations of the present invention are possible in light of the above teachings. It is therefore to be understood that within the scope of the appended claims, the invention may be practiced otherwise than as specifically described herein.

The invention claimed is:

1. A method for reducing keyboard noise in conferencing equipment which includes a microphone and a keyboard, the method comprising:
   providing, at a noise reduction apparatus, an audio signal originating from said microphone;
   detecting, at the noise reduction apparatus, an operation of said keyboard;
   providing, at the noise reduction apparatus, a pre-stored estimate of a transient keyboard audio noise resulting from said operation of said keyboard upon detection of said operation of said keyboard; and
   calculating, at the noise reduction apparatus by using spectral subtraction, a noise reduced output signal based on said estimate of said transient keyboard audio noise and said audio signal.

2. The method according to claim 1, wherein said calculating the noise reduced output signal comprises:
   calculating a gain, based on said audio signal and said pre-stored estimate of said transient keyboard audio noise; and
   multiplying said audio signal by said gain.

3. The method according to claim 1,
   wherein said providing the pre-stored estimate includes selecting the pre-stored estimate from pre-stored data based on an identification of a key operated on said keyboard.

4. The method according to claim 3,
   wherein said pre-stored table is pre-generated by training.

5. The method according to claim 1,
   wherein said providing the audio signal originating from said microphone comprises providing the audio signal as a digital audio signal, amplifying, filtering, sampling and digitizing the audio signal originating from said microphone.

6. The method according to claim 1,
   wherein said step of providing the audio signal is followed by a dividing the audio signal into frequency sub bands.

7. The method according to claim 6,
   wherein said dividing includes configuring the frequency sub bands in accordance with a scale selected from a group including: a uniform scale, a logarithmic scale, and a psychoacoustic.

8. The method according to claim 1, wherein said calculating the noise reduced output signal comprises:
   generating a comfort noise signal, and
   adding said comfort noise signal to said noise reduced output signal.

9. The method according to claim 8, wherein said step of adding said comfort noise signal comprises:
   calculating a comfort noise gain, based on said audio signal and said estimate of said transient keyboard audio noise, and
   amplifying said comfort noise signal by said comfort noise gain.

10. A noise reduction apparatus configured to reduce keyboard noise in conferencing equipment which includes a microphone and a keyboard, the noise reduction apparatus comprising:
    means providing an audio signal originating from said microphone;
    means for detecting an operation of said keyboard;
    means for providing a pre-stored estimate of a transient keyboard audio noise resulting from said operation of said keyboard upon detection of said operation of said keyboard; and
    means for calculating a noise reduced output signal, by using spectral subtraction, based on said estimate of said transient keyboard audio noise and said audio signal.

11. The apparatus of claim 10, wherein said means for calculating the noise reduced output signal comprises:
    means for calculating a gain, based on said audio signal and said pre-stored estimate of said transient keyboard audio noise; and
    means for multiplying said audio signal by said gain.

12. A noise reduction apparatus configured to reduce keyboard noise in conferencing equipment which includes a microphone and a keyboard, the noise reduction apparatus comprising:
    a receiver configured to receive an audio signal originating from said microphone;
    a keyboard operation detecting unit configured to detect an operation of said keyboard; and
    a processor configured to retrieve a pre-stored estimate of a transient keyboard audio noise resulting from said operation of said keyboard from a memory device upon detection of said operation of said keyboard, and to calculate a noise reduced output signal, by using spectral subtraction, based on said estimate of said transient keyboard audio noise and said audio signal.

13. The apparatus according to claim 12, wherein said processor is configured to calculate the noise reduced output signal by calculating a gain, based on said audio signal and said pre-stored estimate of said transient keyboard audio noise, and to multiply said audio signal by said gain.

14. The apparatus according to claim 12,
    wherein said processor is configured to select the pre-stored estimate from pre-stored data based on an identification of a key operated on said keyboard.

15. The apparatus according to claim 14, wherein said pre-stored table is pre-generated by training.

16. The apparatus according to claim 12, wherein said receiver is configured to output the audio signal as a digital audio signal, and to amplify, filter, sample and digitize the audio signal originating from said microphone.

17. The apparatus according to claim 12, further comprising:
a frequency band divider unit configure to divide said audio signal received by the receiver frequency sub bands.

18. A non-transitory computer readable storage medium encoded with instructions, which when executed by a noise reduction apparatus causes the noise reduction apparatus to implement a method for reducing keyboard noise in conferencing equipment which includes a microphone and a keyboard, the method comprising:
providing, at the noise reduction apparatus, an audio signal originating from said microphone;
detecting, at the noise reduction apparatus, an operation of said keyboard;
providing, at the noise reduction apparatus, a pre-stored estimate of a transient keyboard audio noise resulting from said operation of said keyboard upon detection of said operation of said keyboard; and
calculating, at the noise reduction apparatus by using spectral subtraction, a noise reduced output signal based on said estimate of said transient keyboard audio noise and said audio signal.

19. The method according to claim 1, wherein
said detecting includes detecting which key of a plurality of keys on said keyboard is depressed, and
said providing said pre-stored estimate of said transient keyboard audio noise includes selecting from pre-stored data that includes, for each of said plurality of keys on said keyboard, a different pre-stored estimate of a transient noise created by depression of each of said plurality of keys on said keyboard, a pre-stored estimate of a transient noise created by said key detected by said detecting.

20. The apparatus of claim 12, wherein
said keyboard operation detecting unit detects which key of a plurality of keys on said keyboard is depressed, and
said processor retrieves said pre-stored estimate of said transient keyboard audio noise includes selecting from pre-stored data that includes, for each of said plurality of keys on said keyboard, a different pre-stored estimate of a transient noise created by depression of each of said plurality of keys on said keyboard, a pre-stored estimate of a transient noise created by said key detected by said keyboard operation detecting unit.

* * * * *